Nov. 28, 1944.  E. C. CLARKE  2,363,482
TWIST DRILL GRINDER
Filed Oct. 3, 1942  2 Sheets-Sheet 1
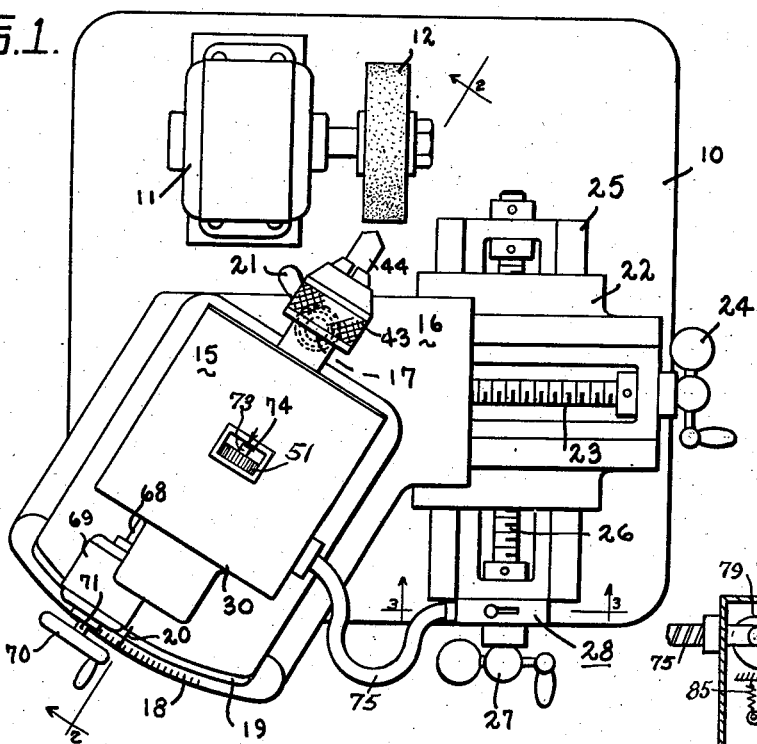
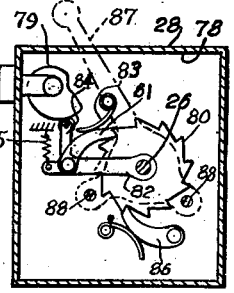
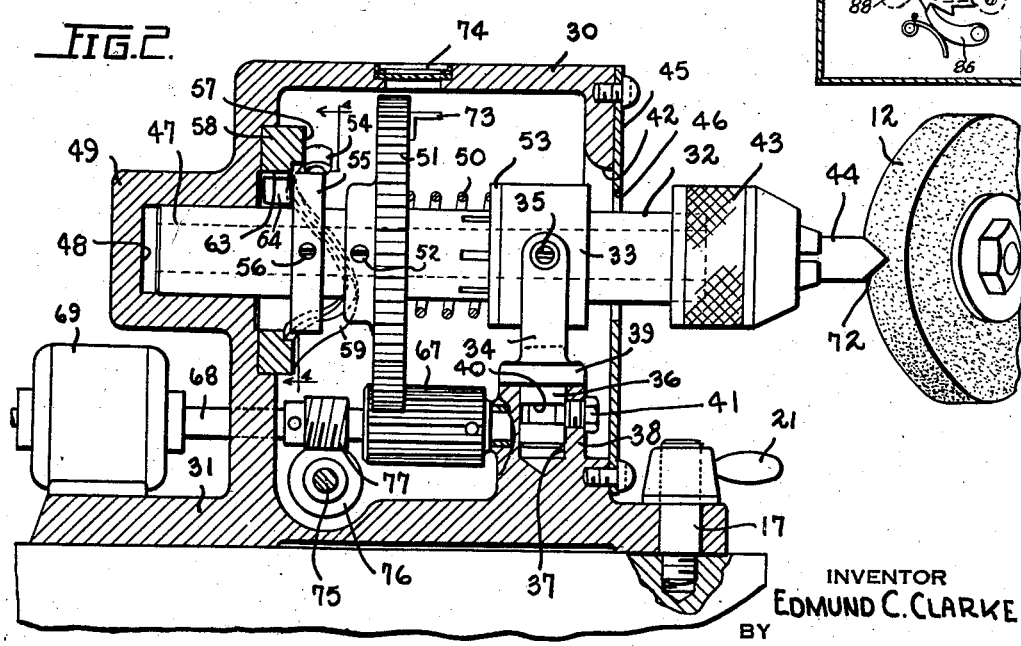
INVENTOR
EDMUND C. CLARKE
BY
ATTORNEYS

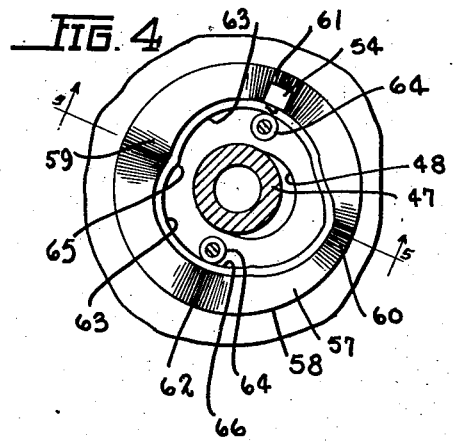
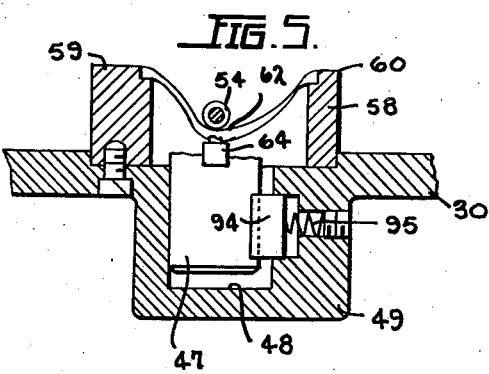
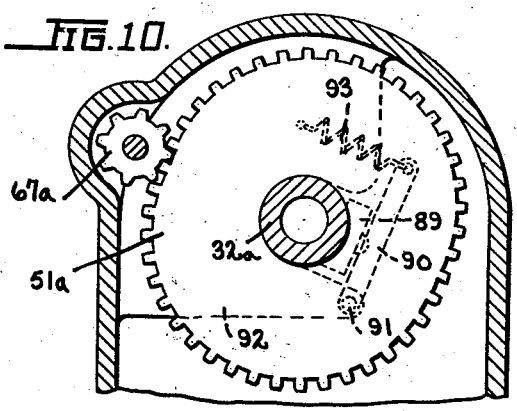
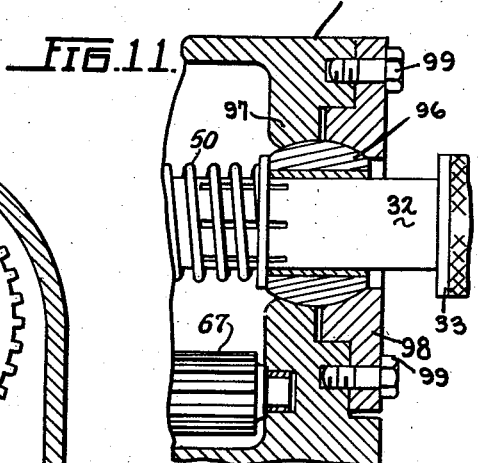
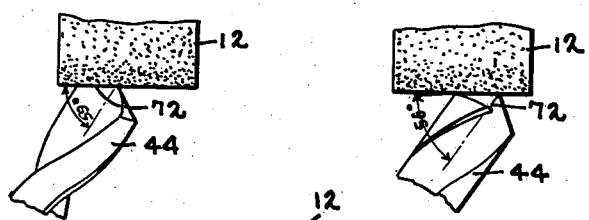
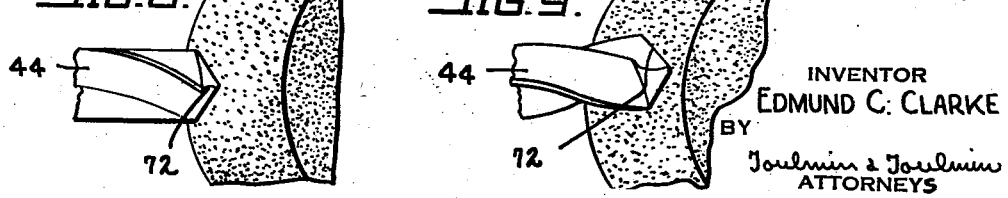
INVENTOR
EDMUND C. CLARKE
BY
Toulmin & Toulmin
ATTORNEYS Patented Nov. 28, 1944

2,363,482

UNITED STATES PATENT OFFICE 2,363,482

TWIST DRILL GRINDER

Edmund C. Clarke, Jacksonville, Fla.

Application October 3, 1942, Serial No. 460,613

7 Claims. (Cl. 51—219)

This invention relates to an apparatus for point-grinding drills.

An object of the invention is to provide an apparatus for presenting a drill to a grinding wheel for grinding a point thereon in such a manner that a predetermined point-angle, and lip-clearance can be obtained, and can be duplicated upon each surface of the drill.

A further object of the invention is to provide an apparatus for re-pointing a drill in accordance with the foregoing object wherein the point-angle, and the lip-clearance can be changed at will.

A still further object of the invention is to provide an apparatus for re-pointing a drill in accordance with the foregoing objects wherein the drill can be continuously rotated to grind away as much of the surface of the drill point as is desired, and yet each complete revolution of the drill will cause production of identical point-angle and lip-clearance on both surfaces of the drill.

Another object of the invention is to provide an apparatus for re-pointing a drill that is constructed and arranged to include any of the features of the foregoing objects wherein the apparatus is motor driven for rotating the drill and for feeding the same toward the grinding wheel.

It is a still further object of the invention to provide a mechanism for feeding a drill toward a grinding wheel a predetermined increment of movement for each complete revolution of the drill thereby causing the same point-angle and lip-clearance to be produced upon both surfaces of the drill.

A still further object of the invention is to provide an apparatus for re-pointing a drill that will advance the drill toward the face of a grinding wheel at the selected point-angle and simultaneously therewith cause the drill surface to move transversely across the grinding wheel to decrease the angularity of the surface of the drill with respect to the axis of the drill, and also simultaneously to move the drill upwardly across the face of the grinding wheel to thereby produce a desired lip-clearance on the drill, the apparatus being constructed and arranged so that both faces of the drill can be ground without removing the drill from the apparatus, or changing its setting in the apparatus whereby duplicate faces are produced upon the drill.

Further objects and advantages will become apparent from the drawings and from the following description.

In the drawings:

Fig. 1 is a plan view of an apparatus incorporating features of this invention.

Fig. 2 is a vertical longitudinal cross-section taken along line 2—2 of Fig. 1 showing the mechanism for producing the desired motion of the drill point with respect to the grinding wheel.

Fig. 3 is a cross-sectional view taken along line 3—3 of Fig. 1 showing a power driven mechanism for feeding the drill toward the grinding wheel.

Fig. 4 is a cross-sectional view taken along line 4—4 of Fig. 2 showing the cam surface on the inner face of the cam member.

Fig. 5 is a cross-sectional view taken along line 5—5 of Fig. 4 to show the cam surface on the face of the cam member.

Fig. 6 is an elevational view of a portion of a grinding wheel and drill showing the position of the drill upon starting the grinding operation.

Fig. 7 is an elevational view similar to Fig. 6 showing the grinding operation in progress.

Figs. 8 and 9 are front elevational views of Figs. 6 and 7, respectively.

Fig. 10 is a partial transverse cross-sectional view of the mechanism of this invention showing a modified arrangement wherein an elliptical or elongated gear is provided for producing one of the cam motions.

Fig. 11 is a vertical longitudinal cross-sectional view showing a modified arrangement for supporting the spindle of the device within a ball and socket joint.

In order to produce a satisfactory life for drills it is essential that the point of the drill shall be ground in a manner that both surfaces of the drill are provided with the same point-angle, with the same lip-clearance, and with the chisel edge at the axis of the drill. Point grinding by hand requires exceedingly great skill and even then there is no assurance that the point-angle of both faces of the drill are identical, nor that the lip-clearance is identical. The apparatus of this invention therefore provides a mechanism where any unskilled operator can correctly grind a drill and the results of grinding are not dependent upon the skill of the operator.

In this invention the apparatus consists of a base plate 10 that supports an electric motor 11 having a grinding wheel 12 suitably secured upon the shaft thereof.

The apparatus for producing the desired motion of a drill relative to the grinding wheel 12 consists of a motion producing mechanism 15, to be hereinafter described, that is carried upon a base member 16, a pivot 17 being provided for permitting angular movement of the motion producing mechanism upon the base 16 to change the point-angle desired to be produced upon the drill that is being ground. Indices 18 are provided on the base 16 adjacent the rear edge 19 of the motion producing mechanism that cooperate with a marker 20 to indicate the angular position of the motion producing mechanism relative to the grinding wheel 12. A suitable locking bolt 21 is provided upon the pivot 17 for securing the motion producing mechanism to the base 16 after adjusting its angular relationship thereupon.

The base 16 is carried upon a slide 22 that has a threaded rod 23 carried thereon which engages a suitable threaded opening in the base 16 to cause movement of the base 16 upon the slide 22 when the threaded rod 23 is rotated by means of the handle 24, to adjust the transverse position of a drill relative to the grinding wheel 12. The slide 22 is carried upon a guide track 25 that is secured to the base 10 for the mechanism and is provided with a threaded rod 26 that is in threaded engagement with a suitable threaded opening in the slide 22 for causing movement of the slide 22 over the guide track 25 when the handle 27 carried upon the threaded rod 26 is rotated, whereby a drill carried by the motion producing mechanism 15 can be moved into and away from the grinding wheel 12. A ratchet mechanism 28 is associated with the threaded rod 26 for rotating the same under power, which mechanism will be hereinafter described.

The motion producing mechanism 15 consists of a housing or case member 30 having a base 31 that receives the pivot 17 and which is locked to the base 16 by the locking bolt 21. A spindle 32 is bearinged in a block 33 that is pivotally mounted upon a fork 34 by means of pivot pins 35 disposed upon the opposite sides of the block 33 so that it is rotatably mounted upon a horizontal axis. The fork 34 is provided with a shank 36 that is rotatably mounted in a vertical bore 37 provided in a boss 38 extending upwardly from the base 31, a shoulder 39 resting upon the upper face of the boss 38 to thereby support the fork 34. An annular groove 40 is provided in the shank 36 and is adapted to receive the end of a bolt 41 to prevent the shank 36 from being removed out of the bore 37, the groove 40 permitting freedom of rotation of the shank 36 in the bore 37 upon a vertical axis, and therefore freedom of rotation of the fork 34. The mechanism just described, therefore provides a universal joint mounting for the spindle 32.

The spindle 32 extends through an opening 42 in one side wall of the housing 30 and is provided with a chuck 43 on the end thereof that is adapted to receive a drill 44. The spindle 32 is hollow so that any length drill can be placed in the chuck 43. A cover plate 45 closes the opening 42 and has an opening 46 through which the spindle 32 extends. An oil seal can be provided in the opening 46 if desired to prevent leakage of lubricating fluid from within the casing 30.

The spindle 32 has the opposite end 47 bearinged in a bore 48 that is elongated in a downwardly declined direction transverse to the axis of the bore 48 as shown in Fig. 4, the bore 48 being provided in a boss 49 on the casing 30. The end 47 of the spindle 32 is retained against one side of the bore 48 by means of a shoe 94 that is spring pressed against the end 47 by means of a spring 95.

The spindle 32 is mounted in the bearings 48 and 33 for both rotation and axial reciprocation. To retain the spindle 32 in position in its bearings a helical spring 50 is disposed between the bearing block 33 and a spur gear 51 secured to the spindle 32 by means of a set screw 52, one end of the helical spring 50 bearing upon a washer 53 that is splined to the spindle 32 and disposed against one face of the bearing block 33. The spring 50 thereby retains the spindle 32 in a rearward position so that a roller 54 carried upon a collar 55 secured to the spindle 32 by means of a set screw 56 will engage the cam face 57 of a cam member 58. The cam member 58 is provided with the hills 59 and 60 and with the valleys 61 and 62 so that when the roller 54 traverses the face 57 of the cam member 58, the spindle 32 will be advanced toward the grinding wheel 12 twice during each revolution of the spindle.

In addition to this advancing motion of the spindle 32, the end 47 of the spindle is moved transversely of the axis of the spindle, the transverse movement being in a downwardly declined direction as produced by the contour of the bearing bore 48. The bearing bore 48 provides the guide means for directing the movement of the rear end 47 of the spindle, while the cam surface 63 provides means for urging the end 47 of the spindle 32 in its transverse motion due to engagement thereof by rollers 64 carried upon the collar 55. The cam surface 63 is provided with a hill 65 that is approached by a surface from the valley 66 so that the roller 64 will gradually move the end 47 of the spindle 32 transversely of the axis of the spindle simultaneous with rotation of the spindle, the transverse movement of the end 47 of the spindle 32 being produced simultaneously with forward advancement of the spindle 32 by means of the roller 54 moving over the surface 57 of the cam member 58.

The co-ordination of the movements of the spindle 32 as produced by the cam surfaces 57 and 63 is such that when a drill 44 is presented to the grinding wheel 12 that the drill will be moved transversely across the face of the grinding wheel, it being assumed that the drill has been positioned at the proper point-angle, and simultaneously therewith the drill will be moved at an upwardly inclined angle across the face of the grinding wheel, it being understood that the drill is rotated during this period of movement to produce the same.

In order to rotate the spindle 32 a pinion 67 is in meshing relationship with the spur gear 51 and is carried upon a drive shaft 68 bearinged in the boss 38 and the side wall of the casing 30. The shaft extends beyond the casing 30 and may be integral with the shaft of a motor 69, or be connected thereto by a suitable coupling. A hand wheel 70 is secured upon the motor shaft 71 that extends from the opposite end of the motor 69 so that the shaft 68 can either be manually rotated or power driven.

As thus far described the apparatus is capable of manual operation to grind a drill point. The motion producing mechanism is positioned upon the base 16 so that it can present a drill to the grinding wheel at a desired point-angle, the most common point-angle being about 59° and therefore the normal position and normal angle of the device being such that it will grind drills with a point-angle of 59°. The indices 18 can indicate various angles from this conventional point. The axis of the spindle 32 is disposed in the same plane as the axis of the grinding wheel 12 so that the axis of the drill 44 will be disposed in a plane extending radially and horizontally from the axis of the grinding wheel.

With the mechanism disposed at the proper point-angle, and locked in position by means of the locking bolt 21, a drill 44 is then positioned in the chuck 43 so that it extends beyond the chuck a slight distance. When grinding the drill the distance that it extends beyond the chuck should always be the same to produce a predetermined point-angle. This extension of the drill can be gauged by the operator's eye or a suitable manual gauge can be provided for setting this extending length of the drill. The drill 44 is positioned with the cutting edge 72 disposed horizontally as shown in Figs. 6 and 8. When the motion producing mechanism is set to begin a grinding operation, that is with the drill in the proper position in the chuck, an indicator 73 secured to the gear 51 will appear opposite a window 74 provided in the top wall of the casing 30. This indicator should always be visible through the window when positioning the drill 44 in the chuck 43 for its initial grinding operation. With the drill in position in the chuck the handle 27 is then rotated to feed the slide 22 forward to carry the drill point into engagement with the grinding wheel 12. The hand wheel 70 may then be rotated to present both faces of the drill to the grinding wheel 12, the cam surfaces 57 and 63 causing the heretofore mentioned movement of the drill point across the face of the grinding wheel in an upwardly inclined direction while being simultaneously rotated so that the point of the drill passes across the face of the grinding wheel and the trailing edge of the surface of the drill is gradually ground away to produce the desired point angle and the desired lip-clearance. As previously mentioned the spindle 32 makes two forward advancements for each rotation of the spindle so that after it has been given one complete revolution both surfaces of the drill have been ground in exactly the same manner because there has been no alteration in the set up that presents the drill to the grinding wheel 12. If sufficient grinding has not taken place upon the first revolution of the drill the handle 27 can be rotated to advance the drill inwardly at right angles to the axis of the grinding wheel so that an additional grind can be made upon the surfaces of the drill in the same manner as heretofore mentioned.

The manner in which the point-angle is changed has heretofore been described. The indices 18 in cooperation with the marker 20 determines the angle at which the point is to be ground. In order to decrease the lip-clearance on the drill it can be extended further from the chuck, the further the end of the drill extends from the chuck, the less clearance being provided on the lip. This can be readily seen from the fact that since the end of the drill moves in an arc about the pivot 17 that the further the end of the drill is from the pivot 17 the less acute will be the arc through which the drill end travels so that the flatter arc produced by the end of the drill extending a substantial distance beyond the chuck will produce less lip-clearance than when the drill end is close to the chuck. The difference in the point angle is not sufficiently great to cause any harmful result.

In Fig. 6 the relative position of the drill 44 with respect to the grinding wheel 12 is shown for the beginning of a drill pointing operation. In this figure the axis of the drill is substantially 59° from the face of the grinding wheel and the cutting edge is disposed horizontally. When the drill is rotated and advanced by the motion producing mechanism it traverses the face of the grinding wheel 12 as shown in Fig. 7 and the angularity between the axis of the drill 44 and the face of the grinding wheel 12 becomes less, such as about 56° as shown in Fig. 7, thereby grinding the trailing edge of the surface deeper than the leading edge to produce the desired lip-clearance of from 12 to 15°. The upward swing of the drill as produced by the motion producing mechanism 15 is such that the heel of the drill surface is cut away slightly more than the remaining surface so as to produce somewhat greater clearance in the heel of the drill surface.

The motion producing mechanism may also be power driven by the motor 69, the motor shaft 71 being common with the drive shaft 68. In this latter instance it is then necessary to provide a mechanism for feeding the drill forward toward the grinding wheel 12 by means of the threaded rod 26. A somewhat diagrammatic form of ratchet mechanism 28 is shown in Fig. 3 for advancing the slide 22 a predetermined increment for each revolution of the spindle 32, whereby both surfaces of the drill 44 will be ground between each increment of feed by the ratchet mechanism when it is power driven by the motor 69.

This ratchet mechanism 28 is driven by means of a flexible shaft 75 that extends from the casing 30 and has a worm wheel 76 thereon driven by a worm 77 secured to the drive shaft 68. The shafts 76 and 32 are in a 1 to 1 ratio. The flexible shaft 75 enters the housing for the ratchet mechanism 28 and is connected to a cam 79.

A ratchet 80 is secured to the threaded rod 26 in any suitable manner. A pawl 81 is carried upon a lever 82 and is spring pressed into engagement with the ratchet 80 by means of the leaf spring 83. The lever 82 has an arm 84 engaging the cam 79 which is retained in engaging relationship by the spring 85. It is readily apparent that rotation of the cam 79 will cause reciprocation of the lever 82 and thus cause engagement of the pawl 81 with the teeth of the ratchet 80 to rotate the same, and thus rotate the screw 26. A holding pawl 86 prevents reverse rotation of the ratchet 80. A lever 87, shown in dot dash lines because it is removed from the view in Fig. 3 due to the manner in which the cross-section is taken, carries pins 88 that are adapted to engage the pawls 86 and 81 to release them from the ratchet 80 when it is desired to operate the screw 26 manually.

Since the flexible shaft 75 rotates once for each rotation of the spindle 32 it will be readily apparent that the drill 44 will be fed toward the grinding wheel 12 only after both faces of the drill have been presented to the grinding wheel. The operation of the device, when motor driven is identically the same as heretofore described with regard to manual operation.

The ratchet 80 may be constructed in a manner that each of the teeth of the ratchet is of a diminishing size so that the throw of the ratchet will be less each time a tooth is engaged, whereby the drill 44 will be moved at a decreasing rate toward the grinding wheel 12. Movement of the drill 44 toward the grinding wheel can be completely stopped by providing a smooth surface area on the surface of the ratchet 80 so that when the pawl 81 would engage the smooth surface area no further advancement of the drill 44 would occur, even though the machine was not turned off. In this manner the grinding operation will remove only a predetermined length of the drill should the operator leave the machine during the grinding operation. The ratchet 80 can be suitably carried upon the shaft 26 so that it can be manually set at the beginning of each grinding operation for removing a predetermined length of the drill.

In Fig. 10 there is shown a modified arrangement for producing the transverse movement of the end 47 of the spindle 32 with respect to its axis to replace the cam surface 63. In this modification the gear 51a is an elongated or elliptical gear. When the gear 51a is driven by the pinion 67a the spindle 32a will be moved transversely with respect to its axis when the elongated side of the gear is in meshing relationship with the spindle 67a. A shoe carried upon a lever 90 that is pivoted at 91 retains the spindle 32a in normal bearing position that is shown in Fig. 10 in the bearing block 92. The spring 93 applies pressure on the end of the lever 90 to thereby retain the shoe 89 against spindle 32a.

In Fig. 11 there is shown a slightly modified arrangement of the mounting for the spindle 32. In this arrangement the spindle 32 carries a ball 96 that engages a socket provided by the wall 97 of the casing 30a and a co-operating retaining plate 98 that is fastened to the casing 30a by means of the bolts 99. This ball and socket joint performs the same function as the heretofore described universal joint shown in Fig. 2.

While the form of the apparatus shown and described herein constitutes a preferred form of the invention, it is to be understood that the apparatus is capable of substantial mechanical alteration without departing from the spirit of the invention, and that all such modifications as fall within the scope of the appended claims are intended to be included herein.

Having thus fully described my invention what I claim as new and desire to secure by Letters Patent is:

1. An apparatus for pointing a drill which consists of, a spindle having means on one end thereof adapted to receive a drill to support the same on the axis of the spindle, means mounting said spindle for universal pivotal movement and axial movement consisting of a ball and socket joint, a mechanism for producing axial movement of said spindle, a second mechanism for moving the end of said spindle opposite to the drill supporting end transversely of the axis of the spindle, and a driving mechanism for rotating said spindle to thereby simultaneously actuate said first two mentioned mechanisms to cause said spindle to be moved axially and rotated upon said universal mounting means.

2. An apparatus for pointing a drill which consists of, a spindle having means on one end thereof adapted to support a drill on the axis of the spindle, means mounting said spindle for universal pivotal movement and for reciprocation, means for moving said spindle axially including cam means and means carried by said spindle cooperating with said cam means, means for moving the end of said spindle opposite to the drill supporting end transversely with respect to the axis of the spindle consisting of an elongated gear means, and means driving said elongated gear means for rotating said spindle to produce said transverse motion of said spindle and simultaneously actuate said cam means and the means cooperating therewith.

3. A drill pointing apparatus including in combination, a rotatable and reciprocable spindle having mechanism for holding a drill to be ground, means forming a universal joint for pivotally supporting said spindle intermediate the ends thereof, a mechanism for moving the spindle axially, a second mechanism for moving the end of the spindle opposite to that which receives the drill in a determined path of travel at a downwardly declining angle whereby to move a drill point extending from the spindle upon an upwardly inclined angle, and mechanism for simultaneously operating said first two mentioned mechanisms concomitantly with rotation of said spindle to cause a drill carried by said spindle to advance toward a grinding member and transversely traverse the grinding member with a constantly changing upwardly inclined angle between the axis of the spindle and the axis of the grinding member while simultaneously being rotated to continuously change the clearance angle on the lip of the drill carried by said spindle.

4. An apparatus for pointing a drill which consists of, a spindle having means on one end thereof to receive a drill to support the same on the axis of the spindle, means mounting said spindle intermediate the ends thereof for universal pivotal movement and for axial movement, a mechanism for producing axial movement of said spindle, a second mechanism for moving the end of said spindle opposite to the drill supporting end transversely of the axis of the spindle and angularly downwardly relatively to the pivotal mounting means for the spindle, a driving mechanism for rotating said spindle and simultaneously actuating said first two mentioned mechanisms to move said spindle axially and rotate the same upon said universal mounting means to produce a continuously changing upwardly inclined motion of the drill supporting end of said spindle.

5. An apparatus for pointing a drill which consists of, a spindle having means on one end thereof to receive a drill to support the same on the axis of the spindle, means mounting said spindle intermediate the ends thereof for universal pivotal movement and for axial movement, a mechanism for producing axial movement of said spindle, a second mechanism for moving the end of said spindle opposite to the drill supporting end transversely of the axis of the spindle and angularly downwardly relatively to the pivotal mounting means for the spindle, a driving mechanism for rotating said spindle and simultaneously actuate said first two mentioned mechanisms to move said spindle axially and rotate the same upon said universal mounting means to produce a continuously changing upwardly inclined motion of the drill supporting end of said spindle, and means for advancing the spindle toward a grinding wheel adapted to cooperate therewith a predetermined increment for each rotation of said spindle.

6. A drill pointing apparatus that includes, a rotatable and reciprocable spindle having means on one end thereof for holding a drill to be ground, universal joint means supporting said spindle intermediate the ends thereof and including means slidably receiving said spindle to permit axial movement therein, bearing means for supporting the end of said spindle opposite to the end that supports a drill, said bearing means including means to position the axis of said spindle in the same plane as the axis of a grinding wheel associated therewith and for allowing the end of the spindle in the bearing means to move angularly downwardly relative to said plane whereby to move a drill carried by said spindle angularly upwardly relative to the grinding wheel associated with the spindle, a mechanism for causing axial movement of said spindle, a second mechanism for causing the end of said spindle to move in said bearing means in a predetermined path as established by said bearing means, and means for rotating said spindle and simultaneously therewith cause operation of the two aforesaid mechanisms to cause said spindle to advance axially toward the grinding wheel and simultaneously continuously change the angularity between the axis of the spindle and the said plane through the grinding wheel to constantly change the approach angle of the spindle toward the grinding wheel.

7. A drill pointing apparatus that includes, a rotatable and reciprocable spindle having means on one end thereof for holding a drill to be ground, universal joint means supporting said spindle intermediate the ends thereof and including means slidably receiving said spindle to permit axial movement therein, bearing means for supporting the end of said spindle opposite to the end that supports a drill, said bearing means including means to position the axis of said spindle in the same plane as the axis of a grinding wheel associated therewith and for allowing the end of the spindle in the bearing means to move angularly downwardly relative to said plane whereby to move a drill carried by said spindle angularly upwardly relative to the grinding wheel associated with the spindle, a mechanism for causing axial movement of said spindle, a second mechanism for causing the end of said spindle to move in said bearing means in a predetermined path as established by said bearing means, and means for rotating the said spindle and simultaneously therewith cause operation of the two aforesaid mechanisms to cause said spindle to advance axially toward the grinding wheel and simultaneously continuously change the angularity between the axis of the spindle and the said plane through the grinding wheel to constantly change the approach angle of the spindle toward the grinding wheel, the said two aforesaid mechanisms being constructed and arranged to cause two identical advancing movements of the spindle toward the grinding wheel during one complete revolution of the spindle.

EDMUND C. CLARKE.